US010913495B2

(12) United States Patent
Sheng et al.

(10) Patent No.: US 10,913,495 B2
(45) Date of Patent: Feb. 9, 2021

(54) VEHICLE SAFETY STEERING SYSTEM

(71) Applicant: STEERING SOLUTIONS IP HOLDING CORPORATION, Saginaw, MI (US)

(72) Inventors: Jian Sheng, Madison Heights, MI (US); Tejas M. Varunjikar, Rochester Hills, MI (US); Farhad Bolourchi, Novi, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 215 days.

(21) Appl. No.: 16/003,662

(22) Filed: Jun. 8, 2018

(65) Prior Publication Data

US 2018/0354555 A1 Dec. 13, 2018

Related U.S. Application Data

(60) Provisional application No. 62/518,099, filed on Jun. 12, 2017.

(51) Int. Cl.
*B62D 15/02* (2006.01)
*B62D 5/04* (2006.01)

(52) U.S. Cl.
CPC ....... *B62D 15/0265* (2013.01); *B62D 5/0463* (2013.01); *B62D 15/026* (2013.01); *B62D 15/0255* (2013.01)

(58) Field of Classification Search
CPC .............. B62D 15/0265; B62D 5/0463; B62D 15/0255; B62D 15/026
See application file for complete search history.

(56) References Cited

U.S. PATENT DOCUMENTS

| 5,182,711 A * | 1/1993 | Takahashi ............ B62D 5/0463 180/446 |
| 5,904,223 A * | 5/1999 | Shimizu ............... B62D 5/0463 180/443 |
| 2003/0025597 A1* | 2/2003 | Schofield ........... G06K 9/00798 340/435 |

(Continued)

FOREIGN PATENT DOCUMENTS

| CN | 101596903 A | 12/2009 |
| CN | 102066185 A | 5/2011 |

(Continued)

OTHER PUBLICATIONS

"Honking your car horn: when is it ok?", posted at Defensive Driving website on Feb. 8, 2017; URL found at https://www.defensivedriving.com/blog/carhorn/ (Year: 2017).*

(Continued)

*Primary Examiner* — Calvin Cheung
(74) *Attorney, Agent, or Firm* — Dickinson Wright PLLC

(57) ABSTRACT

Technical solutions described herein include a steering system that includes a motor that generates assist torque, and a controller that generates a motor torque command for controlling an amount of the assist torque generated by the motor. The steering system further includes a remote object assist module that computes a steering intervention based on a proximity of a vehicle from a detected object. The controller changes the motor torque command using the steering intervention.

25 Claims, 7 Drawing Sheets

(56) References Cited

U.S. PATENT DOCUMENTS

| | | | | |
|---|---|---|---|---|
| 2009/0088925 A1* | 4/2009 | Sugawara | ............ | B60W 30/12 |
| | | | | 701/41 |
| 2009/0244741 A1* | 10/2009 | Schondorf | ............. | B60R 1/072 |
| | | | | 359/843 |
| 2011/0032119 A1* | 2/2011 | Pfeiffer | ................. | B60K 35/00 |
| | | | | 340/905 |
| 2014/0218508 A1 | 8/2014 | Kim | | |
| 2016/0114811 A1* | 4/2016 | Matsuno | ........... | B60W 50/0225 |
| | | | | 701/23 |
| 2016/0121906 A1* | 5/2016 | Matsuno | ................ | B60K 28/10 |
| | | | | 701/23 |
| 2016/0280264 A1* | 9/2016 | Baek | .................. | G06K 9/00805 |
| 2016/0288785 A1* | 10/2016 | Ezoe | ............. | B60W 30/18145 |
| 2018/0022354 A1* | 1/2018 | Akatsuka | ............ | G05D 1/0061 |
| | | | | 701/41 |
| 2018/0114446 A1* | 4/2018 | Stahl | ........................ | H04Q 9/00 |

FOREIGN PATENT DOCUMENTS

| | | | | |
|---|---|---|---|---|
| CN | 104680840 A | 6/2015 | | |
| EP | 2119617 A1 * | 11/2009 | ............. | B62D 15/02 |
| WO | 2012003942 A2 | 1/2012 | | |

OTHER PUBLICATIONS

Chinese Office Action and Search Report from corresponding Chinese Application No. 201810602777.3, dated Aug. 25, 2020, 7 pages.

* cited by examiner

VEHICLE SAFETY STEERING SYSTEM

CROSS-REFERENCES TO RELATED APPLICATIONS

This patent application claims priority to U.S. Provisional Patent Application Ser. No. 62/518,099, filed Jun. 12, 2017, which is incorporated herein by reference in its entirety.

BACKGROUND

Advances in occupant safety in vehicles have played a significant role in reducing the number of fatalities and injuries in last few decades. Such advances include passive safety (seat belt, airbag, chassis structure design etc.) as well as active safety (Electronic Stability Control, Anti-lock Braking System, adaptive cruise, automatic braking system etc.). The active safety technologies are crucial in avoiding a crash or mitigating the severity of a crash.

Vehicles are provided with several technologies that allow the monitoring of conditions about a moving vehicle for providing active safety. The technologies may enable the vehicle to detect the presence of other vehicles and obstacles. The technologies may alert an operator of the vehicle or perform certain maneuvers in response to other vehicles or obstacles.

SUMMARY

A vehicle safety system includes an environmental monitoring system that is configured to monitor a distance and a speed of objects, such as remote vehicles, traffic cones, walls, and the like within a predetermined proximity of a host vehicle. In addition to objects, the environmental monitoring system can also identify the location of lane-marks on a road. The environmental monitoring system is in communication with a steering system having a steering actuator operatively connected to an operator input device. The steering actuator is arranged to provide an input to the operator input device responsive to input signals from the environmental monitoring system.

According to one or more embodiments, a steering system includes a motor that generates assist torque, and a controller that generates a motor torque command for controlling an amount of the assist torque generated by the motor. The steering system further includes a remote object assist module that computes a steering intervention based on a proximity of a vehicle from a detected object. The controller changes the motor torque command using the steering intervention.

According to one or more embodiments, a computer-implemented method includes generating a motor torque command for controlling an amount of assist torque generated by a motor of a steering system of an automotive. The method further includes computing steering intervention based on a proximity of the automotive from a detected object. The method further includes changing the motor torque command using the steering intervention.

According to one or more embodiments, a computer program product includes a memory storage device that includes one or more computer executable instructions which when executed by a controller causes the controller to adjust a handwheel assist torque. The adjusting includes generating a motor torque command for controlling an amount of assist torque generated by a motor of a steering system of an automotive. The adjusting further includes computing steering intervention based on a proximity of the automotive from a detected object. The adjusting further includes changing the motor torque command using the steering intervention.

These and other advantages and features will become more apparent from the following description taken in conjunction with the drawings.

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

The technical solutions described herein facilitate a steering system to further contribute to active safety by helping a driver to avoid a collision or mitigate impact of a collision. For example, the technical solutions described herein may mitigate a sideswipe collision, which may be caused because of a distracted driver, a drowsing driving, a driver not looking before changing lane(s), or uncommon traffic situations etc.

Active safety systems equipped in a vehicle can include lane departure warning system, blind spot detection, active cruise control, etc. The active safety systems use one or more sensors, for example, radar, camera, LIDAR, among others, to continuously monitor objects within predetermined proximity of the vehicle. The active safety systems further predict a potential collision with the object, such as front, rear, and/or side collision. The technical solutions described herein, depending on different threat levels, facilitate an Advanced Driver Assistance System (ADAS) function of a steering system to generate and provide driver feedback. The driver feedback can be generated based on different levels of intervention, e.g. steering wheel buzz, reduced assist, torque overlay and active steering position control to oppose (or discourage) driver from lane changing, or provide further assistance in lane changing, and the like or a combination thereof.

Active safety systems, such as blind spot detection and lane keep assist, typically provide a feedback to the driver by an audible sound, a warning light, or other audiovisual cues.

The technical solutions described herein improves such approach by performing a surrounding perception and situation analysis, by using a steering system of the vehicle as a human machine interface to interact with and to guide the driver to prevent potential side collision. In addition to the audiovisual cues, the technical solutions described herein provide a haptic feedback via the steering wheel to provide a warning, or driver feedback regarding a potential side collision, time to collision, and other such analyzed parameters by modifying an assist torque generated by the steering system. Further yet, in one or more examples, the technical solutions described herein modify the assist torque to oppose (or discourage) a lane change maneuver being performed by the driver, for example, the modification opposing an input torque being applied by the driver.

Figure 1:
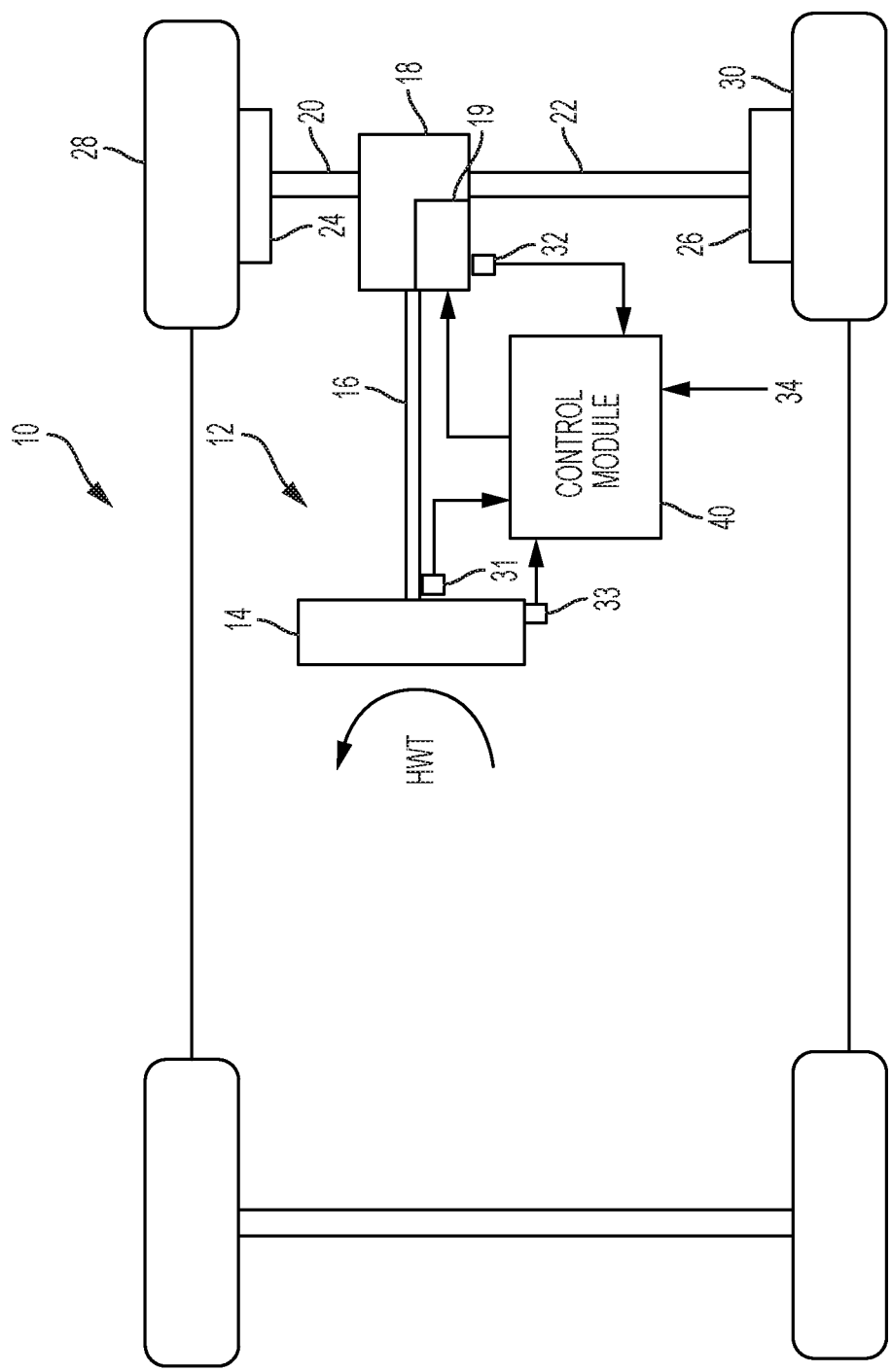
FIG. 1 is an exemplary embodiment of a vehicle including a steering system.

Referring now to the Figures, where the technical solutions will be described with reference to specific embodiments, without limiting same, FIG. 1 is an exemplary embodiment of a vehicle 10 including a steering system 12. It should be noted that the steering system 12 can be an EPS, a steer-by-wire (SbW) system, a hydraulic steering with Magnetic Torque Overlay (MTO), and the like. The embodiments herein describe an EPS, however in other examples, the technical solutions described herein can be implemented in the other types of steering systems. In various embodiments, the steering system 12 includes a handwheel 14 coupled to a steering shaft system 16 which includes steering column, intermediate shaft, & the necessary joints. In one exemplary embodiment, the steering system 12 is an EPS system that further includes a steering assist unit 18 that couples to the steering shaft system 16 of the steering system 12, and to tie rods 20, 22 of the vehicle 10. Alternatively, steering assist unit 18 may be coupling the upper portion of the steering shaft system 16 with the lower portion of that system. The steering assist unit 18 includes, for example, a rack and pinion steering mechanism (not shown) that may be coupled through the steering shaft system 16 to a steering actuator motor 19 and gearing. During operation, as a vehicle operator turns the handwheel 14, the steering actuator motor 19 provides the assistance to move the tie rods 20, 22 that in turn moves steering knuckles 24, 26, respectively, coupled to roadway wheels 28, 30, respectively of the vehicle 10.

As shown in FIG. 1, the vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a torque sensor that senses an input driver handwheel torque (HWT) applied to the handwheel 14 by the operator of the vehicle 10. The torque sensor generates a driver torque signal based thereon. In another example, the sensor 32 is a motor angle and speed sensor that senses a rotational angle as well as a rotational speed of the steering actuator motor 19. In yet another example, the sensor 33 is a handwheel position sensor that senses a position of the handwheel 14. The sensor 33 generates a handwheel position signal based thereon.

A control module 40 receives the one or more sensor signals input from sensors 31, 32, 33, and may receive other inputs, such as a vehicle speed signal 34. The control module 40 generates a command signal to control the steering actuator motor 19 of the steering system 12 based on one or more of the inputs and further based on the steering control systems and methods of the present disclosure. The steering control systems and methods of the present disclosure apply signal conditioning and perform friction classification to determine a surface friction level 42 as a control signal that can be used to control aspects of the steering system 12 through the steering assist unit 18. Communication with other vehicle subsystems (not depicted), can be performed using, for example, a controller area network (CAN) bus or other vehicle network known in the art to exchange signals such as the vehicle speed signal 34. The vehicle speed signal may be generated based on engine rotation speed, or using one or more of wheel speed signals etc.

Figure 2:
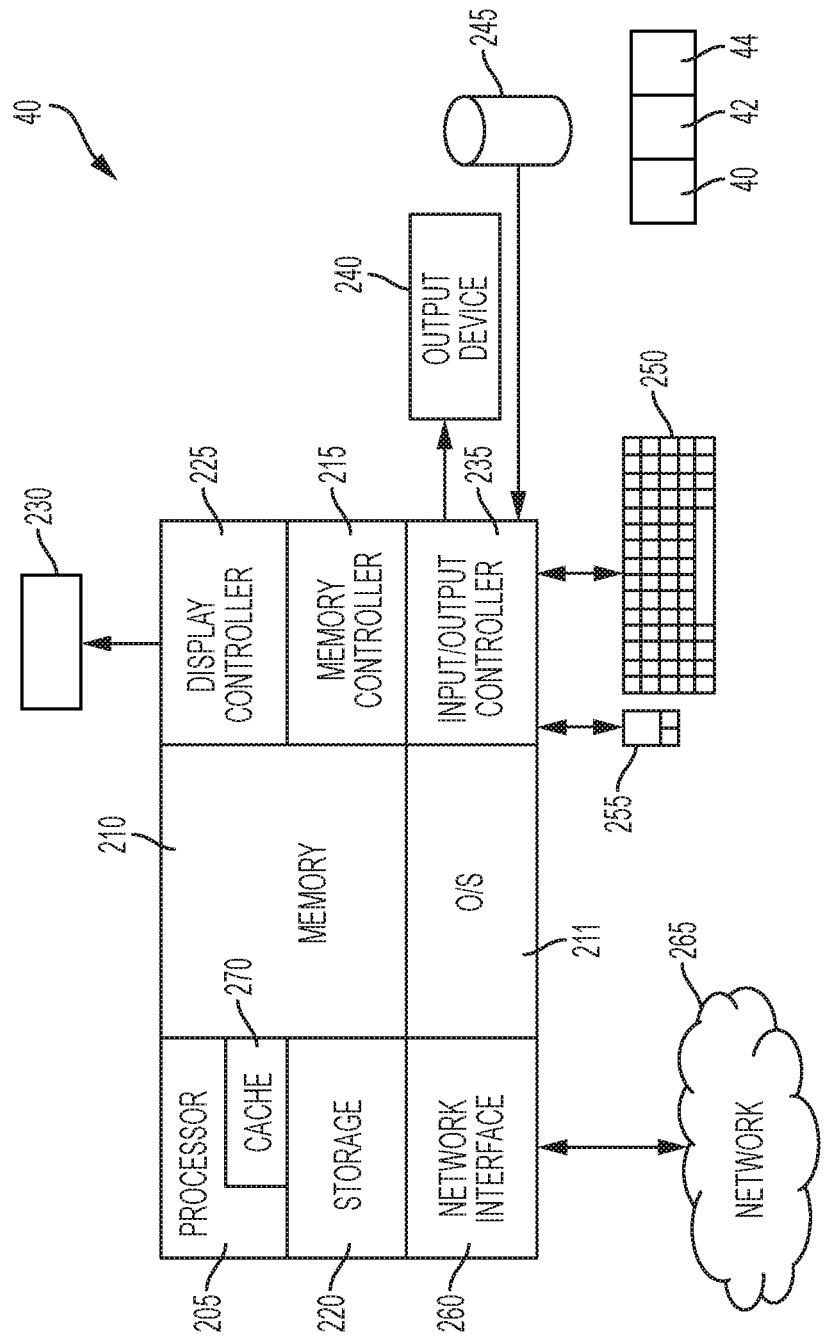
FIG. 2 illustrates an example control module according to one or more embodiments.

FIG. 2 illustrates an example control module 40 according to one or more embodiments. The control module 40 includes, among other components, a processor 205, memory 210 coupled to a memory controller 215, and one or more input devices 245 and/or output devices 240, such as peripheral or control devices that are communicatively coupled via a local I/O controller 235. These devices 240 and 245 may include, for example, battery sensors, position sensors (altimeter 40, accelerometer 42, GPS 44), indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the system 100, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods described herein.

The control module 40 may further include a display controller 225 coupled to a user interface or display 230. In some embodiments, the display 230 may be an LCD screen. In other embodiments, the display 230 may include a plurality of LED status lights. In some embodiments, the control module 40 may further include a network interface 260 for coupling to a network 265. The network 265 may be an IP-based based network for communication between the control module 40 and an external server, client and the like via a broadband connection. In an embodiment, the network 265 may be a satellite network. The network 265 transmits and receives data between the control module 40 and external systems. In some embodiments, the network 265 may be a managed IP network administered by a service provider. The network 265 may be implemented in a wireless fashion, for example, using wireless protocols and technologies, such as WiFi, WiMax, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), a vehicle network (CAN), intranet or other suitable network system and may include equipment for receiving and transmitting signals.

Figure 3:
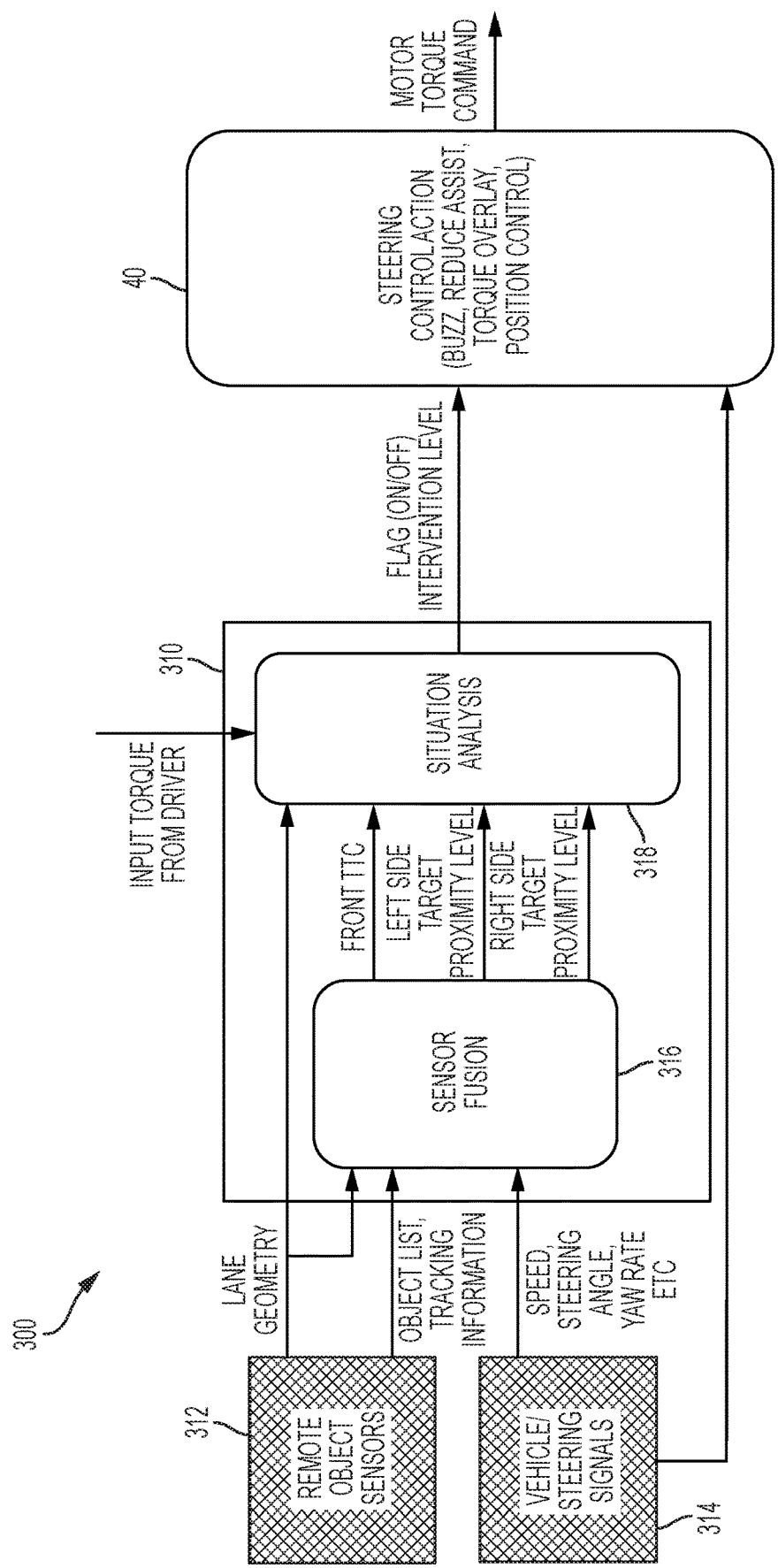
FIG. 3 illustrates an environmental monitoring system according to one or more embodiments.

FIG. 3 illustrates an environmental monitoring system according to one or more embodiments. The environmental monitoring system 300 includes a remote object assist module 310 that is in communication with the steering system 12, for example, with the controller 40 that generates the assist torque. In one or more examples, the remote object assist module 310 is a 'blind zone' assist system that detects remote objects in a blind zone of the host vehicle 10.

In one or more examples, the remote object assist module 310 is part of the steering system 12, for example the control module 40 performing the one or more operations based on output signals from the remote object assist module 310. In one or more examples, the remote object assist module 310 is part of the controller 40 itself. Alternatively, or in addition, the remote object assist module 310 is a separate processing unit, such as an electronic circuit unit (ECU). In one or more examples, the remote object assist module 310 includes one or more computer executable instructions that are read and executed by a processing unit, such as the control module 40.

The remote object assist module 310 uses one or more sensors 312 such as camera, radar, LIDAR, ultrasonic sensor, etc. that the host vehicle 10 is equipped with. Other sensors such as a GPS can be used in addition. In addition, vehicle and steering signals 314 are also input and used by the remote object assist module 310. The vehicle and steering signals can include measurement signals received from the one or more sensors, such as those in the steering system 12, or can include estimated or computed signals from one or more ECUs in the host vehicle 10. The vehicle and steering signals 314 can include a yaw rate, a vehicle speed, a vehicle acceleration, a steering angle, an input torque applied to the handwheel 14 etc.

In one or more examples, a logical combination of two or more sensors 312 can be used by a sensor fusion module 316. The sensor fusion module 316 is responsible for receiving the input signals from the sensors 312 and other vehicle/steering signals 314 and processing the input signals using one or more sensor fusion techniques. Sensor fusion module 316 facilitates combining the sensory data or data derived from the disparate sources, the sensors 312 and vehicle/steering signals 314, such that the resulting information has less uncertainty than using the sources individually.

The sensor fusion module 316, using the input signals, monitors the surroundings of the host vehicle 10 within a predetermined proximity, such as up to a predetermined distance from the host vehicle 10. The sensor fusion module 316 detects one or more remote objects in the surroundings and analyzes if a potential collision of the host vehicle 10 with the detected remote objects is possible. The detected remote objects can include other vehicles (remote vehicle or target vehicle), traffic cones/markers, lane markers, pedestrians, walls, road dividers, or any other such objects that the host vehicle 10 can collide with.

The sensor fusion module 316 computes the time to collision with a remote object that is detected using the input signals and one or more known techniques. For example, the sensor fusion module 316 computes a distance and a speed of a remote vehicle proximate or forward of the host vehicle within the same lane of the host vehicle 10. The sensor fusion module 316 can also compute a distance and a speed of an incoming vehicle in an adjacent lane to the host vehicle 10. For example, the remote object assist module 310 provides blind zone assistance via the steering system 12. In one or more examples, the sensor fusion module 316 sends a front TTC signal to the situation analysis module 318 for determining what steering action can be taken. The front TTC signal indicates a time to collision with a target vehicle that is in front of the host vehicle 10.

Figure 4:
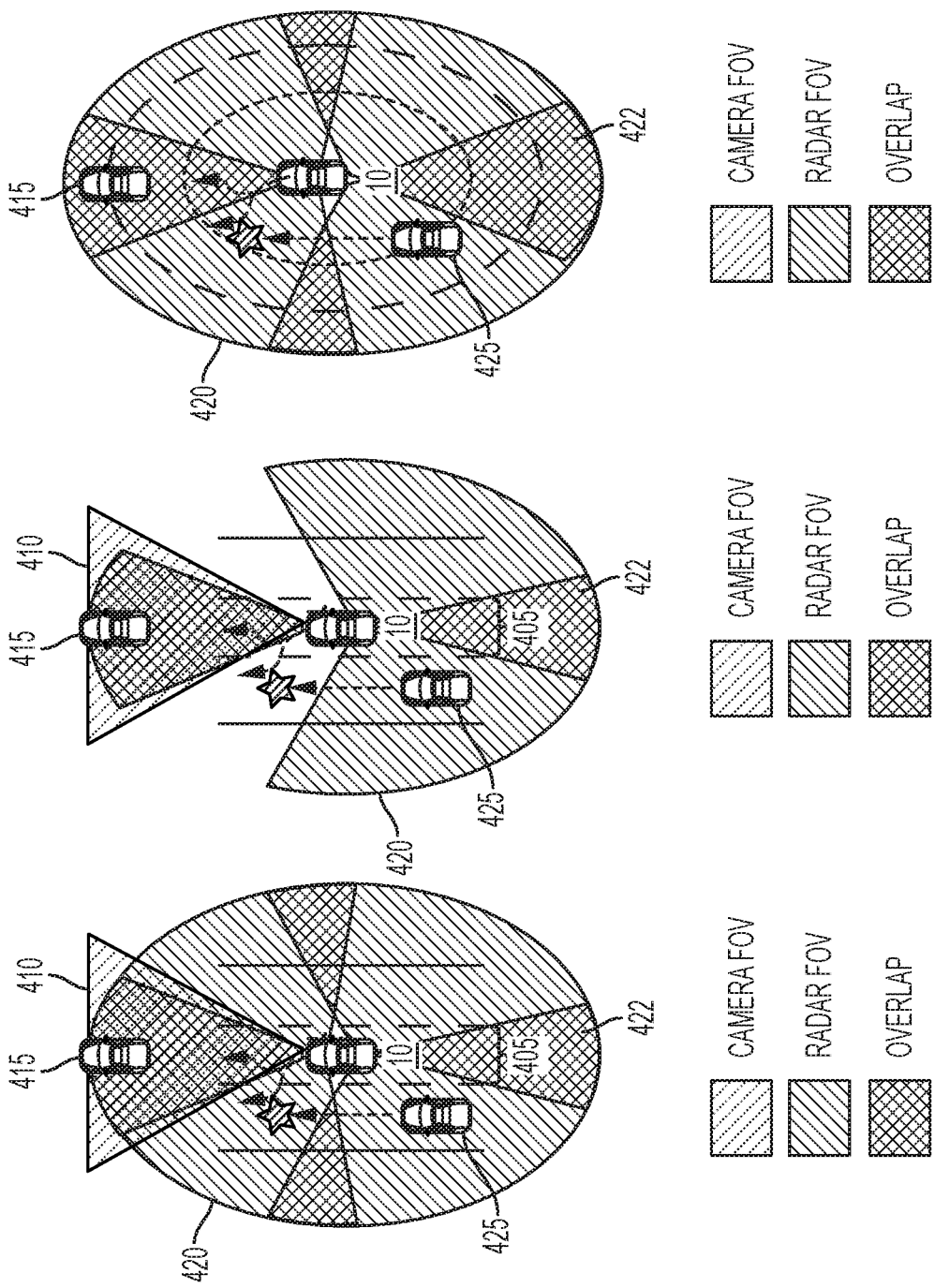
FIGS. 4A, 4B, and 4C, depict example scenarios where an environmental monitoring system provides steering assistance according to one or more embodiments.

FIGS. 4A, 4B, and 4C, depict example scenarios where the environmental monitoring system 300 provides steering assistance according to one or more embodiments. It should be noted that the three different cases are depicted are examples, and that the technical solutions herein can be implemented in other scenarios as well. In FIG. 4A, Case I is depicted in which the remote object assist module 310 uses one or more input signals for lane marks and front object classification information. For example, the environmental monitoring system 300 may include 5 radars and 1 front camera, a front looking radar, two front corner radars, and two rear corner radars. As illustrated, a first region 410 represents the camera's field of view (FOV), a second region 420 represents a radar's field of view, and a third region 422 represents an overlap area between two (or more) radar sensors. In the depicted example, the front radar and camera information is fused to get a common classified object list.

Further, FIG. 4B depicts another system configuration, Case II, that uses one front looking camera for lane marks and front classified object information with 3 radars and 1 front camera, with one front looking radar, two rear corner radars. Here, the front radar and camera information is fused to get a common classified object list.

FIG. 4C depicts a system configuration, Case III, with 3 or 5 radars, which uses the radar sensors to provide a 360 degree field of view. In the depicted example, one front looking radar, two front corner radars and two rear corner radars are set up. Here, the radar information is fused to get a common classified object list.

Referring to FIG. 3, for example, in the front region of the host vehicle (that is 'ahead' of the host vehicle 10), the sensor fusion module 316 keeps tracking the closest front vehicle 415 by using a combination of lane marker 405 detection, radar 420 detection and vehicle signals 314 for cases I and II. In radar-only setup (case III) the sensor fusion module 316 only uses vehicle signals 314 to predict future trajectory of the host vehicle 10. In the side region 420 of the host vehicle 10, radar signals are used to keep tracking targets 425 that are proximate to the host vehicle 10. In both cases, a time to collision (TTC) is calculated using one or more known techniques. Vehicle signals 314 and the lane marks 405 are also used to predict a lane-change status of the host vehicle 10. The lane-change status indicates if the host vehicle 10 is intending to perform a lane change maneuver (left lane change, right lane change, etc.) or continue traveling in the present lane 405.

The remote object assist module 310 further includes a situation analysis module 318, which uses the lane-change status, front time-to-collision, and side time-to-collision to determine whether to trigger one or more levels of steering intervention. For example, if there is an impending front collision, determined based on the front time-to-collision, the side-collision prevention function is switched OFF using the flag provided to the steering action module 40. Alternatively, or in addition, depending on the side time-to-collision, a steering intervention is triggered to prevent a side collision. The steering intervention can include scaling the assist torque generated based on driver input torque, the scaling factor for the scaling based on the analysis of the situation analysis module 318. Alternatively, or in addition, the steering intervention can include generating an overlay torque to oppose or further assist the input torque from the driver. For example, the controller 40 determines the one or more levels of steering interventions.

Figure 5:
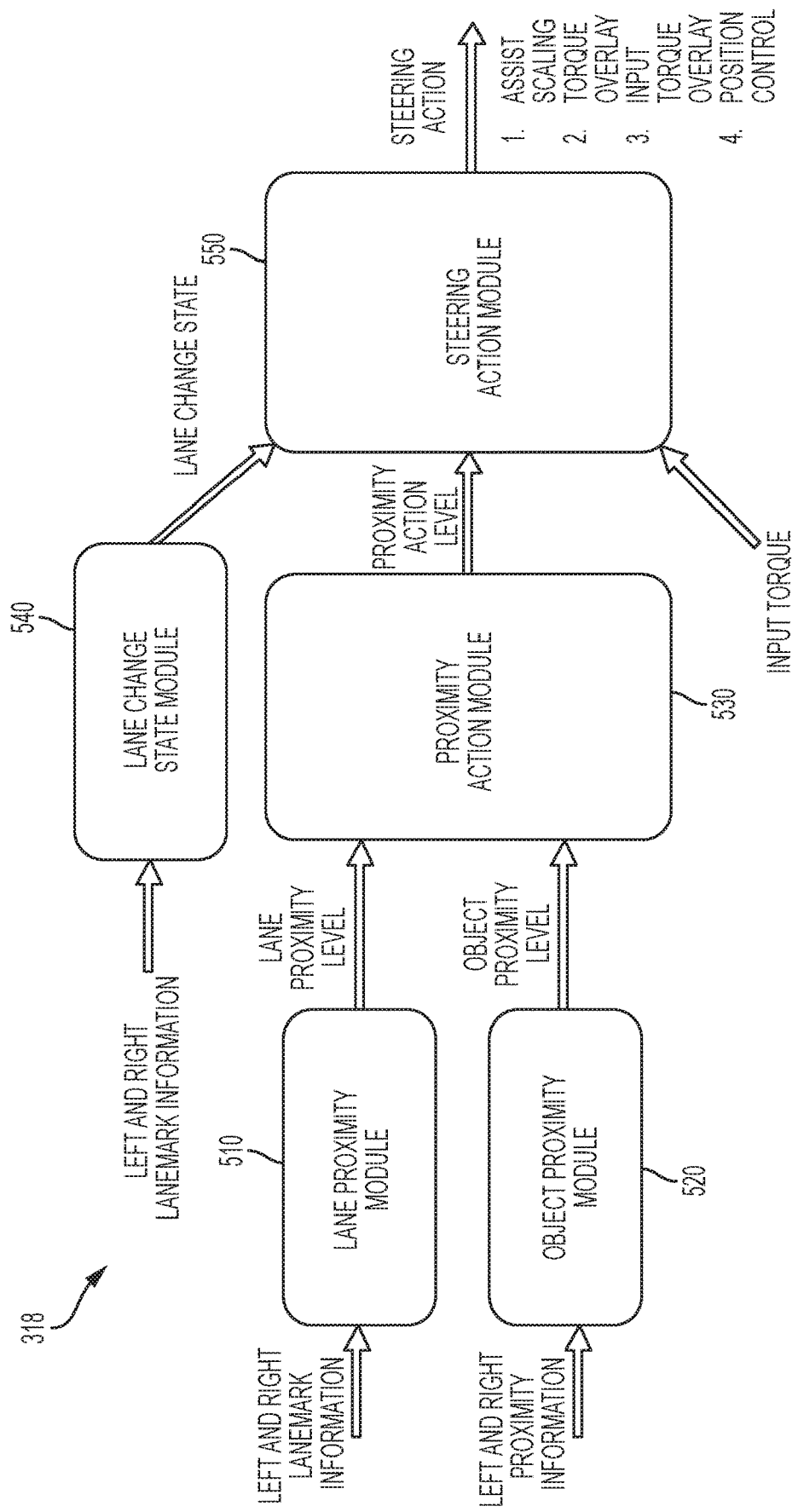
FIG. 5 depicts an operational block diagram for a situation analysis module according to one or more embodiments.

FIG. 5 depicts an operational block diagram for a situation analysis module 318 according to one or more embodiments. It should be noted that in one or more examples, the situation analysis module 318 may include different, fewer, and/or additional modules than those depicted here. The situation analysis module 318 includes, among other components, a lane proximity module 510, an object proximity module 520, a proximity action determination module 530, a lane change status module 540, and a steering action determination module 550.

The lane proximity module 510 determines a distance of the host vehicle 10 from lane markers 405 of the lane in which the host vehicle 10 is traveling. Such distance may be determined for a present position of the host vehicle or a predicted position of the host vehicle 10 (for example, 10 m away), or at multiple points. The distance may be measured using the one or more sensors 312, for example, a camera. In one or more examples, a first (left) distance is measured from a left lane marker and a second (right) distance is measured from a right lane marker. In one or more examples, the measured lane distance(s) is converted into a lane proximity level, for example, using a look up table. Converting a lane distance into the lane proximity level includes checking which predetermined range the lane distance falls into, and selecting a lane proximity level corresponding to the resulting predetermined range. Furthermore, the lane proximity level can also be affected by the rate of change of lane distance (for example, lane closing velocity or acceleration). In one or more examples, there are a predetermined number of lane proximity levels, such as low, medium, high, and the like. The number of lane proximity levels can vary in different examples. The proximity level can be represented by a number in a predetermined range, for example 0 to 1.

The object proximity module 520 determines an object distance of the host vehicle 10 from a detected object on the side of the host vehicle 10, such as a remote vehicle 425. The distance may be measured using the one or more sensors 312, for example, a radar. In one or more examples, the measured object distance is converted into an object proximity level, for example, using a look up table. Converting the object distance into the object proximity level includes checking which predetermined range the object distance falls into, and selecting an object proximity level corresponding to the resulting predetermined range. Depending upon the sensors 312, velocity of tracked objects may also be measured/estimated. Velocity of the detected objects can be used to calculate the proximity level in addition to the distance. In one or more examples, there are a predetermined number of object proximity levels, such as close, medium, far, and the like. The number of object proximity levels can vary in different examples. The proximity level can also be represented by a number in a predetermined range, for example 0 to 1.

The proximity level outputs from the lane proximity module 510 and the object proximity module 520 are forwarded to the proximity action module 530. The proximity action module 530 determines a proximity action level based on the lane proximity level and the object proximity level. The proximity action level converts the lane proximity level and the object proximity level into the proximity action level using a look up table, in one or more examples. In one or more examples, the conversion may be a Boolean logic table. The proximity action level may be mild change lane, stay lane, moderate lane change, fast lane change, and the like. It should be noted that different, fewer, or additional proximity action levels may be used in different examples from those above. The proximity level can also be represented by a number in a predetermined range, for example 0 to 1. The proximity action level is forwarded to the steering action module 550.

The steering action module 550 determines a change to be made in the assist torque being generated based on the proximity action level. In addition, in one or more examples, the steering action module 550 determines the change to be made based on a lane change status and an input torque being provided by the driver via the handwheel 14. The input torque may be measured using one or more sensors; alternatively, the input torque is estimated using known techniques. The steering action module 550 determines at least one of an assist scaling factor, an overlay torque, an input torque overlay, and a position control to adjust the assistance being provided to the driver to maneuver the host vehicle 10.

Figure 6:
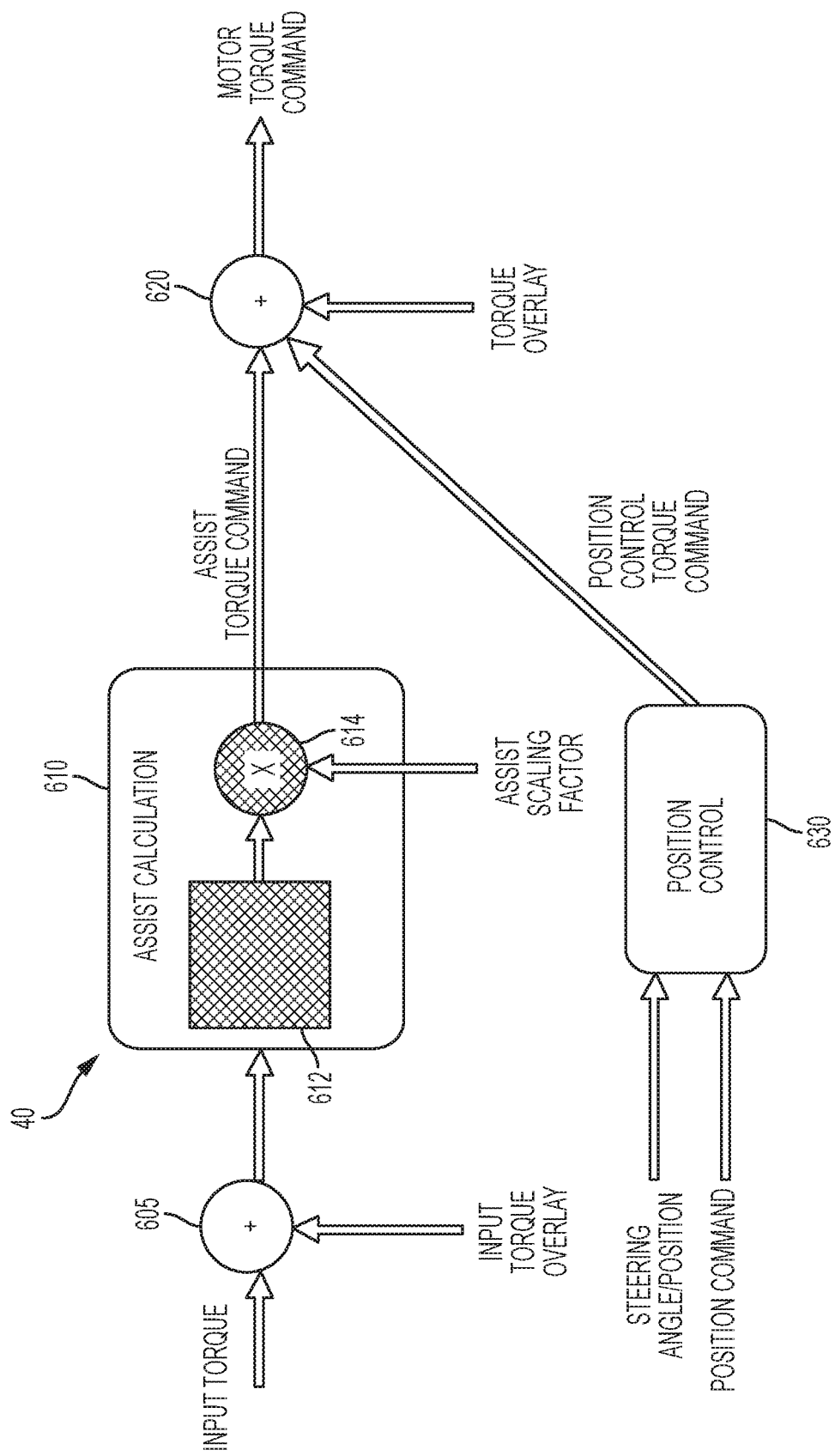
FIG. 6 depicts an operational block diagram of a control module adjusting an assist torque command according to one or more embodiment.

FIG. 6 depicts an operational block diagram of the control module 40 adjusting an assist torque command according to one or more embodiments. The control module 40 of the steering system 12 generates a torque command for generating the assist torque for the driver. Typically, the control module 40 generates the assist torque command based on at least an input torque from the driver at the handwheel. The control module 40 can generate the assist torque command using any one of the known techniques. The assist torque command provides an amount of torque to be generated by the motor 19. The assist torque command is applied by the motor 19 using a motor control system.

The steering motor 19 (actuator) may be commonly referred to as a "hand wheel actuator." The steering actuator is configured as an electromechanical actuator that is operatively connected to an end of the steering shaft. The steering shaft may be received by and may extend at least partially through the steering actuator. The steering actuator may replace a direct mechanical connection between the steering shaft and the steering mechanism that is operatively connected to a vehicle wheel.

The steering motor 19 (or actuator) may be configured to interpret a position of the steering shaft and/or the operator input device connected to the steering shaft and to provide that position as a steering input to the steering mechanism that is operatively connected to the vehicle wheel to pivot the vehicle wheel. The steering actuator is configured to provide an input to the steering shaft or operator input device to resist or oppose rotation of the operator input device based on inputs received by the environmental monitoring system 300.

As shown in FIG. 6, the control module 40 includes an assist calculation module 610 that receives the input torque from the driver and computes the corresponding motor torque command for the motor 19, at 612. The motor torque command, in one or more examples, is an assist torque command. The assist calculation module 610 receives the assist scaling factor computed by the situation analysis module 318. The assist calculation module scales the assist torque command using the assist scaling factor, at 614. In some examples, the assist scaling factor can be a numeric value between 0 and 1. Furthermore, a scaling factor or multiple scaling factors can be used to scale specific sub-component outputs of 612, such as boost curve (to reduce boost curve output), or damping (to increase damping) etc.

Further yet, in one or more examples, the control module 40 receives the overlay torque computed by the situation analysis module 318. The overlay torque is used by the control module 40 to further change the assist torque command, at 620. For example, the overlay torque can be a sinusoidal signal to alert the driver of potential side collision. For example, the overlay torque causes a haptic feedback, such as a vibration of the handwheel 14. Alternatively, or in addition, the haptic feedback includes a push feedback in which the control module 40 applies a torque command to the motor 19, the torque command opposes the driver input. The opposing torque command has a predetermined magnitude and has opposite direction to the driver input. For example, if the driver is providing input torque to maneuver the handwheel 14 to the left, the opposing torque is to the right, and vice versa. In one or more examples, in case the driver is not performing a steering maneuver, the push feedback may be provided in both directions (left and right).

Also, an input torque overlay can be used to modify the input torque value going to assist calculation, at 605. The input torque overlay changes the input torque value that is used by the assist calculation 610 to determine the amount of assist torque to generate and provide. Accordingly, by modifying the input torque based on the proximity action level, the assist torque generated by the steering system 12 is based on the proximity of the detected object. The input torque overlay is a guidance torque command that is generated to adjust the input torque, and thereby the assist torque generated by the motor 19.

Further yet, the position control computed by the situation analysis module 318 provides an angle of the handwheel 14. PID control may be used to provide the position control. For example, in case the position control provides a reference handwheel angle at which the handwheel 14 is to be positioned to either cause a lane change, or oppose or discourage a lane change, at 630. For example, if the lane change is to be opposed, a handwheel angle of 0 degrees may be commanded. Alternatively, or in addition, if the host vehicle 10 is to be maneuvered to the left (or right) by a specific angle to avoid collision with an oncoming vehicle 425 on the right (or left), the handwheel angle to avoid the collision is provided as the reference handwheel angle. A position control module determines a second torque overlay command to position the handwheel according to the reference handwheel angle. The second overlay command is added to the scaled assist torque command at 620. The resulting assist torque command is provided to the motor 19 as a torque command for generating assist torque to the driver and avoid a side collision.

The one or more levels of steering interventions are added into a motor torque command that the control module 40 generates to position the handwheel 14 and/or generate the assist torque.

Figure 7:
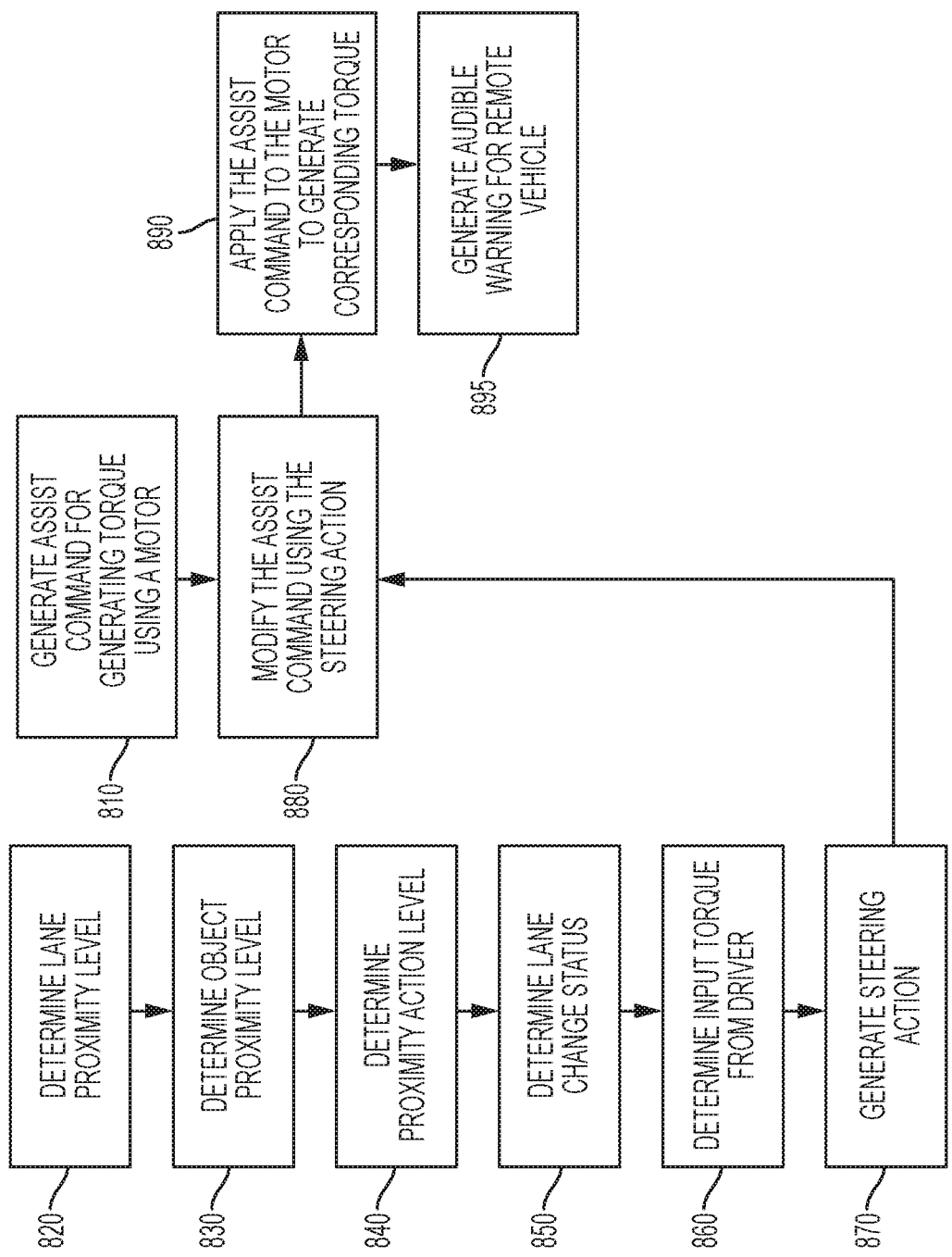
FIG. 7 illustrates a flow chart of an example method for generating a motor torque command by a steering system based on input from an environmental monitoring system according to one or more embodiments.

FIG. 7 illustrates a flow chart of an example method for generating a motor torque command by a steering system based on input from an environmental monitoring system according to one or more embodiments. The method includes generating an assist torque for a driver to maneuver the host vehicle 10 via the steering system 12, at 810. The assist torque is generated using the motor 19 by generating and providing an assist command to the motor. The assist command can be a torque command, a current command, a voltage command, and the like based on a motor control system used to control the motor 19. Using such commands to generate a desired amount of torque from the motor is performed using one or more known techniques that use the input torque from the driver and a reference torque based on a road surface, and other mechanical components to generate a complementary assist torque that facilitates the driver to complete a maneuver using the handwheel 14.

The method further includes determining lane proximity level of the host vehicle 10, at 820. The lane proximity level is determined based on the host vehicle's distance from lane markers 405 based on one or more sensor input. The lane proximity level indicates how far the host vehicle 10 is from one (or more) lane markers 405 adjacent to the host vehicle 10. Further, the method includes determining an object proximity level for the host vehicle 10, at 830. The object proximity level is determined based on the host vehicle's distance from a remote vehicle 425 on the side of the host vehicle 10. The object distance is determined using one or more sensor readings. Further, the object proximity level is based on vehicle signals such as the host vehicle speed, host vehicle acceleration and the like to determine a time to collision of the host vehicle 10 and the remote vehicle 425. In one or more examples, the time to collision is used to determine the object proximity level, wherein the time to collision is converted into the object proximity level using a look up table. The method further includes determining a proximity action level, at 840. The proximity action level is determined based on the lane proximity level and the object proximity level.

Further, the method includes determining a lane change status, at 850. The lane change status is determined based on steering/vehicle signals 314. For example, the lane change status is determined using a handwheel position, an input torque provided to the handwheel, vehicle speed, vehicle acceleration, and the like are used to determine whether a driver is maneuvering the host vehicle 10 to change a lane. For example, a handwheel position tilted to a left (or right) side by at least a predetermined angle may indicate a lane change maneuver when the host vehicle 10 is traveling at least a predetermined vehicle speed.

The method further includes determining an input torque from the driver at the handwheel 14, at 860. The method includes determining, based on the lane change status, the input torque, and the proximity level action, a steering action, at 870. Generating the steering action includes determining whether to assist the driver in changing the lane or to oppose the lane change maneuver. The steering action can include an assist scaling factor, an overlay torque command, and/or a position control command. The steering action is used to modify the assist command that is generated by the control module 40 of the steering system 12, at 880.

For example, if the time to collision with the remote vehicle 425 is less than a first predetermined threshold, such that the host vehicle 10 will collide with the remote vehicle 425 if the lane is changed, the host vehicle 10 is opposed (or discouraged) from changing into the lane in which the remote vehicle 425 is traveling. It should be noted that the time to collision is computed for a predicted position of the host vehicle 10 if the intended lane change maneuver is completed. In this case, to oppose the lane change maneuver, the steering action that is generated generates an assist command that opposes the input torque from the driver and further causes the motor 19 to move the handwheel 14 to the center (0 degrees) to cause the host vehicle 10 to maintain the present lane. In such a case the assist scaling factor is set to 0, so that the control module 40 scales the torque command to 0 (zero).

Alternatively, if the time to collision is greater than the first predetermined threshold, and if the input torque is less than a predetermined level such that a time for the host vehicle 10 to change the lane is greater than the time to collision, the steering action generated may assist in accelerating the lane change maneuver by increasing the assist torque. In such a case the assist scaling factor increases the input torque by a predetermined degree based on the proximity action level. In one or more examples, the scaling factor is selected corresponding to the proximity action level.

Further yet, the steering action can include a torque overlay command that generates a haptic feedback for the driver. In one or more examples, overlay command is a predetermined torque overlay that is added to the assist torque to cause the handwheel 14 to vibrate. In some other examples, overlay command is a predetermined torque overlay that is added to the assist torque so that driver feels a push against the lane change direction. Alternatively, or in addition, the overlay command is a frequency injection signals, such as a sinusoidal signal, that causes a haptic feedback (e.g. buzz) for the driver. The haptic feedback is an additional warning to the driver in addition to the audiovisual feedback that may be provided in one or more examples.

In one or more examples, the method further includes generating an audible noise, such as a horn as a warning for the remote vehicle 425, at 895. The audible noise can be generated using a horn (not shown) of the host vehicle 10, or any other sound generating device of the host vehicle 10 to warn the remote vehicle 425, external to the host vehicle 10.

The technical solutions described herein provide a vehicle safety system includes an environmental monitoring system that is configured to monitor a distance and a speed of a vehicle forward of a host vehicle. The environmental monitoring system is in communication with a steering system having a steering actuator operatively connected to an operator input device. The steering actuator is arranged to provide an input to the operator input device responsive to input signals from the environmental monitoring system.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. A steering system, comprising:
   a motor that generates assist torque;
   a controller that:
      generates a motor torque command for controlling an amount of the assist torque generated by the motor;
      computes a steering intervention based on a proximity of a vehicle from a detected object, the vehicle being equipped with the steering system; and
      changes the motor torque command using the steering intervention, wherein the steering intervention comprises a guidance torque command in response to the proximity being of a predetermined level, and the controller adds the guidance torque command to an input torque from a driver.

2. The steering system of claim 1, wherein the detected object is a lane marker.

3. The steering system of claim 1, wherein the detected object is a target vehicle.

4. The steering system of claim 1, wherein computing the steering intervention comprises:
   determining driver intention of lane change based on an input torque from a driver.

5. The steering system of claim 1, wherein the steering intervention comprises an overlay torque command, and the controller generates a haptic feedback by adding the overlay torque command with the motor torque command.

6. The steering system of claim 1, wherein the proximity of the detected object is determined using one or more sensors comprising a radar, a camera, a lidar, and an ultrasonic sensor.

7. The steering system of claim 1, wherein the steering intervention comprises a position command, and the controller changes a position of the motor according to the position command.

8. The steering system of claim 1, the steering intervention comprises an assist scaling factor, wherein the controller multiplies the motor torque command by the assist scaling factor.

9. A computer-implemented method comprising:
   generating a motor torque command for controlling an amount of assist torque generated by a motor of a steering system of a vehicle;
   computing steering intervention based on a proximity of the vehicle from a detected object; and
   changing the motor torque command using the steering intervention, wherein the steering intervention comprises an assist scaling factor, wherein the controller multiplies the motor torque command by the assist scaling factor.

10. The computer-implemented method of claim 9, wherein the detected object is a target vehicle on a left side or a right side of the vehicle.

11. The computer-implemented method of claim 10, further comprising:
   generating an audible noise external to the vehicle for warning the target vehicle.

12. The computer-implemented method of claim 9, wherein computing the steering intervention comprises determining a lane change status of the vehicle based on an input torque from a driver, the lane change status indicative of a driver intention of performing a lane change maneuver.

13. The computer-implemented method of claim 9, wherein determining the steering intervention further comprises:
   computing an overlay torque command; and
   generating a haptic feedback by adding the overlay torque command with the motor torque command.

14. The computer-implemented method of claim 9, wherein determining the steering intervention further comprising:
   computing a guidance torque command for a lane change maneuver in response to the proximity being of a predetermined level; and
   adding the guidance torque command to an input torque from a driver and using the sum for generating the motor torque command.

15. The computer-implemented method of claim 14, wherein the guidance torque command opposes a lane change maneuver by providing an opposing torque to the input torque to oppose changing a position of a handwheel.

16. The computer-implemented method of claim 9, wherein the steering intervention comprises a position command, and the controller changes a position of the motor according to the position command.

17. A computer program product comprising a memory storage device that includes one or more computer executable instructions which when executed by a controller causes the controller to adjust a handwheel assist torque, the adjusting comprising:
   generating a motor torque command for controlling an amount of assist torque generated by a motor of a steering system of a vehicle;
   computing a steering intervention based on a proximity of the vehicle from a detected object; and
   changing the motor torque command using the steering intervention, wherein the steering intervention comprises a guidance torque command in response to the proximity being of a predetermined level; and
   adding the guidance torque command to an input torque from a driver.

18. The computer program product of claim 17, wherein the detected object is a remote vehicle.

19. The computer program product of claim 18, wherein the one or more computer executable instructions when executed by the controller cause the controller to generate an audible noise external to the vehicle for warning the remote vehicle.

20. The computer program product of claim 17, wherein computing the steering intervention comprises determining a lane change status of the vehicle based on an input torque from the driver, the lane change status indicative of a driver intention of performing a lane change maneuver.

21. The computer program product of claim 17, wherein the guidance torque command opposes a lane change maneuver by providing an opposing torque to the input torque to oppose changing a position of a handwheel.

22. The computer program product of claim 17, wherein the steering intervention further comprises a position command, and the controller changes a position of the motor according to the position command.

23. The computer program product of claim 17, wherein the steering intervention further comprises an assist scaling factor, wherein the controller multiplies the motor torque command by the assist scaling factor.

24. The computer program product of claim 17, wherein determining the steering intervention further comprises:
   computing an overlay torque command; and generating a haptic feedback by adding the overlay torque command with the motor torque command.

25. The computer program product of claim 17, wherein computing the steering intervention is further based on a velocity of the detected object.

\* \* \* \* \*